(12) United States Patent
Itakura et al.

(10) Patent No.: US 7,638,198 B2
(45) Date of Patent: *Dec. 29, 2009

(54) CLEAR COATING COMPOSITION, METHOD OF FORMING MULTILAYER COATING FILM AND INMOLD DECORATION PRODUCT

(75) Inventors: Tatsuya Itakura, Saitama (JP); Takashi Yamamoto, Saitama (JP); Manabu Yamaoka, Osaka (JP); Toshihiko Uchiyama, Osaka (JP)

(73) Assignees: Honda Motor Co., Ltd., Tokyo (JP); Nippon Bee Chemical Co., Ltd., Osaka (JP)

( * ) Notice: Subject to any disclaimer, the term of this patent is extended or adjusted under 35 U.S.C. 154(b) by 836 days.

This patent is subject to a terminal disclaimer.

(21) Appl. No.: 11/147,398

(22) Filed: Jun. 8, 2005

(65) Prior Publication Data

US 2006/0014024 A1  Jan. 19, 2006

(30) Foreign Application Priority Data

Jun. 9, 2004  (JP) ............................. 2004-171735
Sep. 15, 2004  (JP) ............................. 2004-267837

(51) Int. Cl.
*B32B 27/40* (2006.01)
(52) U.S. Cl. ................. 428/425.8; 428/423.1
(58) Field of Classification Search ............... 428/423.1, 428/425.8
See application file for complete search history.

(56) References Cited

U.S. PATENT DOCUMENTS

| 6,645,564 | B2 | 11/2003 | Hasegawa et al. |
| 6,737,116 | B2 | 5/2004 | Hasegawa et al. |
| 2003/0108751 | A1* | 6/2003 | Hasegawa et al. ........... 428/458 |

FOREIGN PATENT DOCUMENTS

| EP | 0 421 027 A1 | 4/1991 |
| JP | 10-088171 A | 4/1998 |
| JP | 2002-121462 A | 4/2002 |
| JP | 2002-256454 | 9/2002 |
| JP | 2002-256455 | 9/2002 |
| JP | 2003-155580 | 5/2003 |
| JP | 2003-238901 A | 8/2003 |

OTHER PUBLICATIONS

Japanese Office Action dated Oct. 9, 2007, issued in corresponding Japanese Application No. 2005-154062.

* cited by examiner

*Primary Examiner*—Thao T. Tran
(74) *Attorney, Agent, or Firm*—Westerman, Hattori, Daniels & Adrian, LLP

(57) ABSTRACT

A clear coating composition which inhibits a corrosion reaction by containing a rust preventive agent in a clear layer on a silver-plating payer and preventing a corrosive substance such as chlorine ion from contacting with the surface of the silver-plating layer, and develops beautiful silver-plating design for a long time, and an inmold decoration product comprising a silver-plating layer. The clear coating composition is used in forming a multilayer coating film obtained by forming a base coating film layer, a silver-plating layer, and a clear coating film layer in succession on a plastic substrate.

4 Claims, No Drawings

CLEAR COATING COMPOSITION, METHOD OF FORMING MULTILAYER COATING FILM AND INMOLD DECORATION PRODUCT

TECHNICAL FIELD

The present invention relates to a clear coating composition, a method of forming a multilayer coating film and an inmold decoration product.

BACKGROUND ART

Since an inmold decoration product including a silver-plating layer on a plastic material exhibits an appearance like a metal, it can be used in automobile interior parts such as a meter cluster, a center cluster, a center console, etc.; automobile exterior parts such as wheel caps, a bumper braid, wheel garnishes, a grille radiator, a back panel, door mirror covers, door handles, etc.; and applications other than automobile's parts such as an air conditioner's housing, a cellular phone, a notebook computer, a cosmetic case, etc.

However, a decorative multilayer coating film, which contains a silver-plating layer, has a problem that the silver-plating layer is discolored or exhibits whitish haze in testing the coat performance according to a salt spray test or after a lapse of a long time and therefore it loses design value.

As a method of improving such a problem, there is described a method of producing plated products comprising the step of removing a trace of impurities existing on the metal surface artificially in Japanese Kokai Publication 2002-256454. But, in such an approach, since number of steps increases, it was not efficient and its effect was not adequate.

In Japanese Kokai Publication 2002-256455, there is described a plated product which protects corrosion from extending throughout a metal-plating layer when the corrosion is generated by purposefully forming microcracks in the metal-plating layer to prevent the degradation of design. However, since such an approach does not essentially prevent the corrosion of metal itself, its effect is limited and a beautiful appearance cannot be maintained for a sufficiently long time.

In Japanese Kokai Publication 2003-155580, there is described a method of retarding the corrosion of metal by including a coating layer comprising a specific silicon acrylic resin to inhibit the permeation of water into a metal-plating layer. But, it is desired to enhance its effect more and to realize a higher level of protection of corrosion.

SUMMARY OF THE INVENTION

It is an object of the present invention to provide a clear coating composition which inhibits a corrosion reaction by containing a rust preventive agent in a clear layer on a silver-plating layer and preventing a corrosive substance such as chlorine ion from contacting with the surface of the silver-plating layer, and develops beautiful silver-plating design for a long time, and an inmold decoration product comprising a silver-plating layer.

The present invention relates to a clear coating composition used in forming a multilayer coating film comprising a silver-plating layer, said multilayer coating film being obtainable by forming a base coating film layer, a silver-plating layer and a clear coating film layer in succession on a plastic substrate, wherein the clear coating composition is a two-package polyurethane coating composition comprising a main material containing acrylic polyol and a curing agent containing a polyisocyanate compound, the equivalence ratio of an NCO group in said polyisocyanate compound to an OH group in said acrylic polyol (NCO/OH) ranges from 0.8/1 to 1.2/1, and the clear coating composition contains a rust preventive agent in the proportions of 1.0 to 13.0 parts (on a basis of solids weight) with respect to 100 parts by weight of the total of the acrylic polyol and the rust preventive agent.

The above-mentioned main material preferably contains acrylic polyol, a non-aqueous dispersed resin and epoxysilane expressed by the following general formula (1);

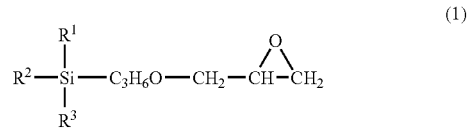

wherein $R^1$ represents a methyl group, a methoxy group or an ethoxy group, and $R^2$ and $R^3$ are identical to or different from each other and represent a methoxy group or an ethoxy group.

The above-mentioned rust preventive agent is preferably a fatty acid amide compound.

The present invention also relates to a method of forming a multilayer coating film comprising a silver-plating layer, wherein the method comprises a step of forming a base coating film layer, a silver-plating layer and a clear coating film layer in succession on a plastic substrate, and the clear coating film layer is formed from the above-mentioned clear coating composition.

The present invention also relates to an inmold decoration product comprising a silver-plating layer, which is obtained by forming a base coating film layer, a silver-plating layer and a clear coating film layer formed from the above-mentioned clear coating composition in succession on a plastic material.

The above-mentioned inmold decoration product preferably has a primer layer between the plastic material and the base coating film layer.

DETAILED DESCRIPTION OF THE INVENTION

Hereinafter, the present invention will be described in more detail.

A clear coating composition of the present invention is a clear coating composition containing a rust preventive agent. The clear coating composition of the present invention prevents discoloration of silver due to a corrosive substance such as chlorine ion by containing a rust preventive agent. The above-mentioned rust preventive agent is preferably one having compatibility with the main material of the two-package polyurethane coating composition. Use of such rust preventive agent as described above is preferred in that corrosion can be prevented while retaining the transparency of a clear coating film.

As the above-mentioned rust preventive agent, there can be given, for example, a rust preventive agent of a fatty acid amide compound, a rust preventive agent of benzothiazole and a rust preventive agent of ketocarboxylic acid. It is particularly preferred that the above rust preventive agent is a fatty acid amide compound in point of particularly excellent compatibility with the main material of the two-package polyurethane coating composition.

As the above-mentioned fatty acid amide compound, there can be given, for example, Nopcochecks RA (trade name: produced by SANNOPCO LTD.) as a commercially available product.

The above-mentioned rust preventive agent of benzothiazole is a compound having a skeleton of benzothiazole containing succinic acid in a molecule and can include, for example, 1-(benzothiazol-2-ylthio)succinic acid and di-($C_{12}$-$C_{14}$ alkyl ammonium) (2-benzothiazol-2-yl-thio)succinate. As a commercially available rust preventive agent of benzothiazole, there can be given IRGACORE 252LD, IRGACORE 153 (both trade name; produced by Ciba Specialty Chemicals K.K.).

The above-mentioned rust preventive agent of ketocarboxylic acid is a compound having a skeleton of ketocarboxylic acid. Specifically, there are known a product of an addition reaction of 4-methyl-γ-oxo-benzenebutanoic acid and N-ethylmorpholine. As a commercially available product, there can be given IRGACORE 1405 (trade name; produced by Ciba Specialty Chemicals K.K.).

The above rust preventive agent is contained in the proportions of 1.0 to 13.0 parts by weight (on a basis of solids weight) with respect to the total amount of the acrylic polyol and the rust preventive agent in the clear coating composition. When the content of the above rust preventive agent is less than 1.0 part by weight, it is impossible to adequately inhibit a corrosion reaction and to adequately prevent discoloration. When the content of the above rust preventive agent is more than 13.0 parts by weight, a clear coating film exhibits colorations and adhesion of the coating film is deteriorated. An amount of the above rust preventive agent to be added is more preferably 2.0 to 10.0 parts by weight.

The clear coating composition of the present invention is a two-package polyurethane coating composition comprising a main material containing acrylic polyol and a curing agent containing a polyisocyanate compound. The two-package polyurethane coating composition comprising main material containing acrylic polyol and a curing agent containing a polyisocyanate compound has excellent properties in point of adhesion after water-soak test, corrosion resistance and appearance of an inmold decoration product.

Acrylic polyol contained in the above-mentioned main material for a clear coating composition is not particularly limited as long as it is an acrylic resin containing a hydroxyl group and may be a modified resin.

A hydroxyl group value of the above acrylic polyol is preferably 35 to 85 mg KOH/g and more preferably 40 to 75 mg KOH/g. When it is less than 35 mg KOH/g, number of points of a crosslinking reaction with the polyisocyanate curing agent is insufficient and therefore physical properties of a coating film may be inadequate, and when it is more than 85 mg KOH/g, a coating film may become brittle due to too many number of points of a crosslinking reaction, or humidity resistance and water resistance of a coating film may be deteriorated due to excessive hydroxyl groups and it is not preferred.

A weight average molecular weight of the above-mentioned acrylic polyol is preferably 10000 to 60000 and more preferably 10000 to 40000. When it is less than 10000, physical properties of a coating film tend to decrease, and when it is more than 60000, the workability of coating tends to decrease and finished appearance tends to deteriorate. In addition, in the present specification, the weight average molecular weight is a value which is measured, for example, by GPC (gel permeation chromatography) and determined on the polystyrene equivalent basis.

The above-mentioned acrylic polyol can be obtained by polymerizing monomer compositions comprising a hydroxyl group-containing radically polymerizable monomer and another radically polymerizable monomer to be used as required by a normal method.

As the above-mentioned hydroxyl group-containing radically polymerizable monomer is not particularly limited and can include, for example, 2-hydroxyethyl (meth)acrylate, 4-hydroxybutyl (meth) acrylate, hydroxypropyl (meth) acrylate, and a compound obtained by ring-opening 2-hydroxyethyl (meth)acrylate with epsilon-caprolactone (PRACCEL FA- and FM-series produced by DAICEL CHEMICAL INDUSTRIES, LTD.). These may be used singly or in combination of two or more species.

As the above-mentioned another radically polymerizable monomer is not particularly limited and can include, for example, carboxylic group-containing monomers such as (meth) acrylic acid, maleic acid, itaconic acid and the like, epoxy group-containing monomers such as glycidyl (meth) acrylate and the like, methyl (meth)acrylate, ethyl (meth) acrylate, isopropyl (meth)acrylate, n-butyl (meth)acrylate, 2-ethylhexyl (meth)acrylate, styrene, vinyl toluene, vinyl acetate and alpha-methyl styrene. These may be used singly or in combination of two or more species.

The above acrylic polyol can be obtained by polymerizing the above-mentioned monomer compositions, and as a method of producing the above acrylic polyol, conventional methods of producing acrylic resins, which are publicly known, can be employed. That is, polymerization methods such as solution polymerization, non-aqueous dispersion polymerization and bulk polymerization can be adopted, but the solution polymerization is suitable from the viewpoint of the ease of polymerization, the adjustment of molecular weight, and the ease of use in preparing a coating composition.

As the above acrylic polyol, a commercially available product can also be used. As the commercially available acrylic polyol, there can be given, for example, DIANAL LR-2586 (trade name, produced by MITSUBISHI RAYON CO., LTD., OH value: 60 mg KOH/g, weight average molecular weight: 30000, Tg: 40° C., acid value: 3 mg KOH/g), ACRYSET 2050-55 (trade name, produced by NIPPON SHOKUBAI CO., LTD.) and HITALOID 3371 (trade name, produced by Hitachi Chemical Co., Ltd.).

The above-mentioned main material is one constituent component of the two-package polyurethane coating composition and contains the above acrylic polyol. The above main material may further contain a non-aqueous dispersed resin, an epoxysilane compound, a surface control agent, a light stabilizer, an ultraviolet absorber, a curing catalyst and an anti-settling agent in addition to the above acrylic polyol.

The above-mentioned non-aqueous dispersed resin is a resin dispersed in an organic solution and is generally referred to as an NAD. The above non-aqueous dispersed resin is not particularly limited and any non-aqueous dispersed resin such as acrylic resin, acrylic polyol resin or acrylic styrenic resin, which can be used in a field of a coating composition, can be used.

A hydroxyl group value of the above non-aqueous dispersed resin is preferably 0 to 250 mg KOH/g and more preferably 100 to 190 mg KOH/g. When it is more than 250 mg KOH/g, a coating film may become brittle due to too many number of points of a crosslinking reaction, or humidity resistance and water resistance of a coating film may be deteriorated due to excessive hydroxyl groups and it is not preferred.

As a commercially available product of the above non-aqueous dispersed resin, there can be given, for example, Setalux 1850SS-50 (produced by Akzo Nobel K. K) and HITALOID 6110 (produced by Hitachi Chemical Co., Ltd.).

When the main material in the clear coating composition of the present invention contains the non-aqueous dispersed resin, the weight ratio [(non-aqueous dispersed resin)/ (acrylic polyol)] of solids in the above non-aqueous dispersed resin to solids in the above acrylic polyol preferably ranges from 5/95 to 25/75. When the weight ratio is less than 5/95, the adhesion to a silver-plating layer and the corrosion resistance may be deteriorated. When it is more than 25/75, haze may be generated in an inmold decoration product. It is more preferably within a range of 5/95 to 20/80.

The above-mentioned epoxysilane is preferably a compound expressed by the following general formula (1);

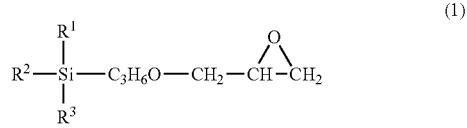

wherein $R^1$ represents a methyl group, a methoxy group or an ethoxy group, and $R^2$ and $R^3$ are identical to or different from each other and represent a methoxy group or an ethoxy group.

The epoxysilane expressed by the above general formula (1) is a compound to be used as a coupling agent. As the above-mentioned epoxysilane, there can be given 3-glycidoxypropyltrimethoxysilane (commercially available as KBM-403 from Shin-Etsu Chemical Co., Ltd.), 3-glycidoxypropylmethyldiethoxysilane (commercially available as KBE-402 from Shin-Etsu Chemical Co., Ltd.) and 3-glycidoxypropyltriethoxysilane (commercially available as KBE-403 from Shin-Etsu Chemical Co., Ltd.).

In the main material in the clear coating composition for inmold decoration product of the present invention, the weight ratio [(epoxysilane)/[(acrylic polyol)+(non-aqueous dispersed resin)]] of solids in the above epoxysilane to solids in the total of the above acrylic polyol and the above non-aqueous dispersed resin preferably ranges from 1.5/100 to 5.5/100. When the weight ratio is less than 1.5/100, the adhesion to a silver-plating layer and the corrosion resistance may be deteriorated. When it is more than 5.5/100, it is economically disadvantageous. It is more preferably within a range of 2.0/100 to 4.0/100.

If the weight ratio of the solids in the above-mentioned acrylic polyol, epoxysilane and non-aqueous dispersed resin is specified within the range described above, adhesion, corrosion resistance, a precipitating property of silver, smoothness of the base coating film layer and appearance of a laminated product can be more improved.

The above-mentioned polyisocyanate is not particularly limited as long as it is a compound having two or more isocyanate groups and can include, for example, aromatic diisocyanates such as trilene diisocyanate, 4,4'-diphenylmethane diisocyanate, xylylene diisocyanate, meta-xylylene diisocyanate and the like; aliphatic diisocyanates such as hexamethylene diisocyanate and the like; alicyclic diisocyanates such as isophorone diisocyanate and the like; and monomers thereof and polymers of a biuret type, an isocyanurate type and adduct type thereof.

As a commercially available product of the above polyisocyanate, there can be given DURANATE 24A-90PX (tradename, NCO: 23.6%, produced by ASAHI KASEI CORPORATION), Sumidur N-3200-90M (trade name, produced by Sumitomo Bayer Urethane Co., Ltd.), TAKENATE D165N-90X (trade name, produced by MITSUI TAKEDA CHEMICALS, INC.), Sumidur N-3300, Sumidur N-3500 (both trade name, produced by Sumitomo Bayer Urethane Co., Ltd.) and DURANATE THA-100 (trade name, produced by ASAHI KASEI CORPORATION).

In the above-mentioned clear coating composition, the equivalence ratio of an NCO group in the above curing agent for a clear coating composition to an OH group in the above acrylic polyol for a clear coating composition (NCO/OH) ranges from 0.8/1 to 1.2/1. When the equivalence ratio is less than 0.8/1, coating film strength of a clear coating film becomes insufficient, and when it is more than 1.2/1, adhesion becomes insufficient. The above-mentioned equivalence ratio (NCO/OH) is more preferably within a range of 0.9/1 to 1.1/1.

A method of forming a multilayer coating film of the present invention comprises the steps of forming a base coating film layer, a silver-plating layer and a clear coating film layer in succession on a plastic substrate. That is, it is a method of forming a base coating film layer, a silver-plating layer and a clear coating film layer in succession on a plastic material of a molded article having specific configuration such as an injection molded article, a plate-like article like a film or a sheet, and a blow molded container, which comprises plastic materials, and molded articles having the coating films formed by the method of forming a multilayer coating film of the present invention exhibit the appearance like metal by the silver-plating layer.

The above-mentioned base coating film layer is formed by using a base coating composition. The above-mentioned base coating composition is not particularly limited and can include, for example, a polyurethane resin coating composition, an acrylic resin coating composition, a silicone resin coating composition, an epoxy resin coating composition, an alkyd resin coating composition and amino alkyd resin coating composition. Among others, it is preferred to use a two-package polyurethane resin coating composition from the viewpoint of adhesion after water-soak test, corrosion resistance and appearance of an inmold decoration product.

The two-package polyurethane resin coating composition to be used as the above base coating composition comprising a main material containing acrylic polyol and a curing agent containing a polyisocyanate compound as with the clear coating composition of the present invention. The main material of the base coating composition may contain an organic modified polydimethylsiloxane and an epoxysilane compound in addition to acrylic polyol.

Acrylic polyol contained in the above-mentioned main material for a base coating composition is not particularly limited as long as it is an acrylic resin containing a hydroxyl group and may be a modified resin.

A hydroxyl group value of the above acrylic polyol contained in the above main material for a base coating composition is preferably 60 to 140 mg KOH/g and more preferably 70 to 100 mg KOH/g. When it is less than 60 mg KOH/g, number of points of a crosslinking reaction with the polyisocyanate curing agent is insufficient and therefore physical properties of a coating film may be inadequate, and when it is more than 140 mg KOH/g, a coating film may become brittle due to too many number of points of a crosslinking reaction, or humidity resistance and water resistance of a coating film may be deteriorated due to excessive hydroxyl groups and it is not preferred.

A weight average molecular weight of the above acrylic polyol contained in the above main material for a base coating composition is preferably 10000 to 70000 and more preferably 15000 to 50000. When it is less than 10000, physical properties of a coat tend to decrease, and when it is more than 70000, the workability of coating tends to decrease and finished appearance tends to deteriorate. In addition, in the present specification, the weight average molecular weight is a value which is measured, for example, by GPC (gel permeation chromatography) and determined on the polystyrene equivalent basis.

The above acrylic polyol contained in the above main material for a base coating composition can be obtained by polymerizing monomer compositions comprising a hydroxyl group-containing radically polymerizable monomer and another radically polymerizable monomer to be used as required by a normal method.

As the above-mentioned hydroxyl group-containing radically polymerizable monomer and another radically polymerizable monomer are not particularly limited and monomers, which have been described as a monomer which can be used for synthesis of the acrylic polyol to be used in the above main material of the clear coating composition, can be used. These may be used singly or in combination of two or more species. A method of polymerization can be performed by the same method as in the acrylic polyol to be used in the main material of the clear coating composition.

The above acrylic polyol can be obtained by polymerizing the above monomer compositions, and as a method of producing the above acrylic polyol, conventional methods of producing acrylic resins, which are publicly known, can be employed. That is, polymerization methods such as solution polymerization, non-aqueous dispersion polymerization and bulk polymerization can be adopted, but the solution polymerization is suitable from the viewpoint of the ease of polymerization, the adjustment of molecular weight, and the ease of use in preparing a coating composition.

The above acrylic polyol may be an alkyd modified acrylic polyol resin. The above-mentioned alkyd modified acrylic polyol resin can be obtained by performing the polymerization reaction of the above monomer in the presence of an alkyd resin.

As a commercially available product of the above-mentioned alkyd modified acrylic polyol resin, there can be given, for example, ACRYDIC WZU-771, ACRYDIC LU-293 (both produced by DAINIPPON INK AND CHEMICALS, INCORPORATED) and Tesroid 4220-50 (produced by Hitachi Kasei Polymer Co., Ltd.)

The above-mentioned organic modified polydimethylsiloxane, which can be added to the above main material for a base coating composition, is polydimethylsiloxane modified with an organic compound and a compound to be used as a surface control agent of a high molecular weight. The above-mentioned organic modified polydimethylsiloxane is not particularly limited and can include, for example, polyester modified acrylic group-containing polydimethylsiloxane and polyether modified polydimethylsiloxane. These may be used singly or in combination of two or more species.

A weight average molecular weight of the above organic modified polydimethylsiloxane is preferably 10000 to 50000 and more preferably 10000 to 35000. When it is less than 10000, physical properties of a coating film tend to decrease, and when it is more than 70000, the workability of coating tends to decrease and finished appearance tends to deteriorate.

As a commercially available product of the above organic modified polydimethylsiloxane, there can be given, for example, polyester modified acrylic group-containing polydimethylsiloxane and polyether modified polydimethylsiloxane such as BYK-371 and BYK-307 (both produced by byk-chemie Japan Co., Ltd.).

As the above epoxysilane compound which can be added to the above main material for a base coating composition, the same compound as that described as a epoxysilane compound which can be used in the above clear coating composition can be used.

When the above organic modified polydimethylsiloxane is employed in the above main material for a base coating composition, the weight ratio [organic modified polydimethylsiloxane/acrylic polyol] of solids in the above organic modified polydimethylsiloxane to solids in the above acrylic polyol preferably ranges from 0.02/100 to 0.20/100. When the weight ratio is less than 0.02/100, a precipitating property of silver and smoothness of the base coating film layer may be deteriorated. When it is more than 0.20/100, the adhesion of the base coating film layer to the silver-plating layer, the corrosion resistance and the water resistance may be deteriorated. It is more preferably within a range of 0.04/100 to 0.16/100.

When the above epoxysilane is used in the above main material for a base coating composition, the weight ratio [epoxysilane/acrylic polyol] of solids in the above epoxysilane to solids in the above acrylic polyol preferably ranges from 1.5/100 to 5.5/100. When the weight ratio is less than 1.5/100, the adhesion of the base coating film layer to a silver-plating layer and the corrosion resistance may be deteriorated. When it is more than 5.5/100, a rainbow may be generated in an inmold decoration product. It is more preferably within a range of 2.0/100 to 5.0/100.

The above main material for a base coating composition can be obtained by mixing and stirring the above respective components with a publicly known means. And, pigments such as a coloring pigment, an extender pigment and a luster color pigment; solvents such as butyl acetate ester, toluene, xylene and methyl isobutyl ketone; and additives such as an ultraviolet absorber, an anti-oxidant, a curing catalyst and an anti-settling agent may be further added to the main material for a base coating composition as required.

In the above-mentioned base coating composition, the equivalence ratio of an NCO group in the above curing agent for a base coating composition to an OH group in the above acrylic polyol (NCO/OH) preferably ranges from 1.5 to 3.0. When the equivalence ratio is less than 1.5, the adhesion of abase coating film layer to a silver-plating layer and the corrosion resistance may be deteriorated and a rainbow may be generated in an inmold decoration product. When it is more than 3.0, the rainbow may be generated in an inmold decoration product. The above-mentioned equivalence ratio (NCO/OH) is more preferably within a range of 1.5 to 2.5.

The above-mentioned curing agent for a base coating composition preferably comprises a polyisocyanate compound.

The above-mentioned polyisocyanate compound is not particularly limited and for example, the compound, described as one which can be used in the clear coating composition described above, can be employed.

When the above base coating composition is a two-package polyurethane coating composition comprising the main material solution for a base coating composition and the curing agent for abase coating composition, the above base coating film layer can be formed by mixing the above two components immediately before use and applying. Formation of the base coating film layer by applying with the above base coating composition can be carried out by a usual method such as spray coating. After applying a coating composition, heat setting was conducted at a temperature of 60 to 100° C. and it is preferred to obtain a coating film having a cured film thickness of 20 to 30 μm.

A method of forming the multilayer coating film of the present invention is conducted by forming a silver-plating layer on the above base coating film layer. By forming the silver-plating layer on the above base coating film layer, it is possible to form a silver-plating layer which has a highly precipitating property of silver and is superior in appearance and adhesion.

In a step of plating, it is preferred to have a step of applying a 0.1 to 3% by weight solution of tin chloride ($SnCl_2$) to a molded article provided with the above dried base coating film layer or immersing the molded article provided with the above dried base coating film layer in the 0.1 to 3% by weight solution of tin chloride to cause tin to be absorbed on the surface of the base coating film layer. By conducting the above step, adhesion of a silver becomes good. Subsequently, the surface of the molded article is preferably water-washed using deionized water or distilled water to remove excessive tin chloride not absorbed. Since, thereby, corrosion and discoloration of the silver-plating layer are inhibited more favorably, it is preferred. In addition, palladium (Pd) may be employed in place of the above tin.

A method of forming the silver-plating layer is not particularly limited and it can be conducted by electroless plating referred to as a silver mirror reaction. As the most popular method, there can be given a method of applying ammonium silver nitrate ($[Ag(NH_3)_2]^+OH^-$) referred to as a Tollens agent and a reductant solution to the above base coating film layer so as to be mixed on the surface of the coating film. The above-mentioned reductant is not particularly limited and can include, for example, saccharides such as glucose or the like; organic compounds containing an aldehyde group such as glyoxal or the like; sodium nitrite and sodium thiosulfate.

A method of forming the multilayer coating film of the present invention is conducted by providing a clear coating film layer on the above silver-plating layer. Thereby, the silver-plating layer is protected from degradation and corrosion resistance is enhanced. Also, the appearance of a laminated product is more enhanced. And, in the inmold decoration product of the present invention, the above clear coating film layer is formed by using the clear coating composition described above.

In the above clear coating composition, coating is carried out by mixing the above respective components immediately before use. Formation of the clear coating film layer by coating with the above clear coating composition can be carried out by a usual method such as spray coating. After applying a coating composition, heat setting was conducted at a temperature of 60 to 100° C. and it is preferred to obtain a coat having a cured film thickness of 20 to 40 μm. When the dry film thickness is less than 20 μm, corrosion resistance and appearance may be deteriorated. When it is more than 50 μm, it is not preferred in that popping or sagging becomes apt to occur. A dry film thickness of the above clear coating film layer is more preferably 25 to 35 μm.

A plastic material, to which the method of forming the multilayer coating film of the present invention is applied, is not particularly limited and can include, for example, ABS (acrylonitrile-butadiene-styrene copolymer), PC (polycarbonate)/ABS alloy, PP (polypropylene), olefinic thermoplastic elastomers (TPO), PMMA (polymethyl methacrylate) or TPE (thermoplastic elastomers) can be given. As these materials, there can be used one molded by publicly known methods of molding such as injection molding, extrusion molding, blow molding or the like.

The above-mentioned plastic material may be one having a primer layer between the above base coating film layer and the surface of the material. It is possible to enhance the adhesion between the base coating film layer and the surface of the material by forming the primer layer. It is preferred to have the primer layer particularly when an olefinic plastic material such as polypropylene, which is low in adhesion, is used.

The above-mentioned primer layer can be formed by applying a primer coating composition. As the above-mentioned primer coating composition, a primer coating composition of chlorinated polypropylene is preferably employed and RB 116 primer coating composition (produced by NIPPON BEE CHEMICAL CO., LTD.) can be given.

An inmold decoration product, having a multilayer coating film formed by the method of forming the multilayer coating film of the present invention described above, also constitutes the present invention. The inmold decoration product of the present invention can be suitably used in automobile interior parts such as a meter cluster, a center cluster, a center console, etc.; automobile exterior parts such as wheel caps, a bumper braid, wheel garnishes, a grille radiator, a back panel, door mirror covers, door handles, etc.; and applications other than automobile's parts such as an air conditioner's housing, a cellular phone, a notebook computer, a cosmetic case, etc.

EFFECT OF THE INVENTION

By using the clear coating composition of the present invention, it is possible to inhibit a problem that the silver-plating layer is discolored or exhibits whitish haze and that therefore its design value is deteriorated, and to obtain a multilayer coating film developing beautiful silver-plating design for a long time.

BEST MODE FOR CARRYING OUT THE INVENTION

Hereinafter, the present invention will be described in more detail by way of examples, but the present invention is not limited to these examples. In addition, "part(s)" means to "part(s) by weight" and "%" means "% by weight" in Examples, unless otherwise specified.

(Preparation of Main Material Solution for Base Coating Composition)

Acrylic polyol was put into a container equipped with a stirrer, and to this, organic modified polydimethylsiloxane and epoxysilane were added with stirring and finally butyl acetate ester was added, and the mixture was stirred for 30 minutes to obtain a main material solution for a base coating composition. Here, amounts of the respective raw materials to be blended are shown in Table 1. "ACRYDIC WZU-771" in Table 1 is acrylic polyol produced by DAINIPPON INK AND CHEMICALS, INCORPORATED and an alkyd modified acrylic resin in which an OH value is 84 mg KOH/g, a weight average molecular weight is 20000, % by weight of solids is 50% and an acid value is 5 mg KOH/g. "BYK-371" is polyester modified acrylic group-containing polydimethylsiloxane produced by byk-chemie Japan Co., Ltd., and its weight average molecular weight is 28000 and OH value is 0 mg KOH/g. "KBM-403" is 3-glycidoxypropyltrimethoxysilane produced by Shin-Etsu Chemical Co., Ltd. (epoxy equivalent 236). Values in Table 1 represent parts by weight.

TABLE 1

|  |  | Solids | Solution |
|---|---|---|---|
| Main material solution for base coating composition | A1: acrylic polyol ACRYDIC WZU-771 | 100 | 200.0 |
|  | A2: organic modified polydimethylsiloxane | 0.07 | 0.18 |

TABLE 1-continued

| | | Solids | Solution |
|---|---|---|---|
| | BYK-371 | | |
| | A3: epoxysilane KBM-403 | 3.5 | 3.5 |
| | butyl acetate ester | | 45.3 |
| | total | 103.57 | 248.98 |
| | NV % | | 41.6 |
| Curing agent solution for base coating composition | Polyisocyanate Sumidur N-3300 | 57.2 | 76.3 |
| Equivalence ratio (NCO/OH) | | | 2/1 |
| Weight ratio of solids A2/(A1:100) | | | 0.07 |
| Weight ratio of solids A3/(A1:100) | | | 3.5 |

Preparation of Main Material Solution for Clear Coating Composition (Examples 1 to 4 and Comparative Examples 1 to 4)

Acrylic polyol, a rust preventive agent and butyl acetate ester were put into a container equipped with a stirrer, and to this, a surface control agent, SANOL LS-292 and 90% by weight xylene solution of TINUVIN 384 were added with stirring, and the mixture was stirred for 30 minutes to obtain a main material solution for a clear coating composition.

Acrylicpolyol: DIANAL LR-2586 produced by MITSUB-ISHI RAYON CO., LTD., OH value: 60 mg KOH/g, weight average molecular weight:

30000, Tg: 40° C., acid value: 3 mg KOH/g

Surface control agent: SH 2000-100CS produced by Dow Corning Toray Silicone Co., Ltd.

SANOL LS-292: a light stabilizer produced by SANKYO CO., LTD.

TINUVIN 384: an ultraviolet absorber produced by Ciba Specialty Chemicals K.K.

Preparation of Main Material Solution for Clear Coating Composition (Example 5)

Acrylic polyol, a rust preventive agent and butyl acetate ester were put into a container equipped with a stirrer, and to this, epoxysilane, a surface control agent, SANOL LS-292 and 90% by weight xylene solution of TINUVIN 384 were added with stirring and finally non-aqueous dispersed resin was added, and the mixture was stirred for 30 minutes to obtain a main material solution for a clear coating composition.

Acrylicpolyol: DIANAL LR-2586 produced by MITSUB-ISHI RAYON CO., LTD.; OH value: 60 mg KOH/g, weight average molecular weight: 30000, Tg: 40° C., acid value: 3 mg KOH/g Non-aqueous dispersed resin: Setalux 1850SS-50, acrylic NAD produced by Akzo Nobel K.K., OH value: 169 mg KOH/g, nonvolatile (NV) matter content 50%

Epoxysilane: KBM-403 produced by Shin-Etsu Chemical Co., Ltd., 3-glycidoxypropyltrimethoxysilane, epoxy equivalent: 236 Surface control agent: SH 2000-100CS produced by Dow Corning Toray Silicone Co., Ltd.

SANOL LS-292: a light stabilizer produced by SANKYO CO., LTD.

TINUVIN 384: an ultraviolet absorber produced by Ciba Specialty Chemicals K.K.

Curing Agent Solution for Clear Coating Composition

The polyisocyanate compound in Table 2 is one obtained by diluting DURANATE 24A-90PX (trade name, produced by ASAHI KASEI CORPORATION, NCO: 23.6%,) to a nonvolatile matter concentration of 70% by weight with butyl acetate ester.

(Preparation of Test Piece)

Pretreatment of Polypropylene Substrate

A polypropylene substrate having a size of 70 mm×100 mm×3 mm was cleaned with isopropanol and dried, and then to this, a diluted chlorinated polypropylene primer coating composition was applied by spraying in such a way that a dry film thickness is 7 µm, and cured at 80° C. for 10 minutes. Here, the diluted chlorinated polypropylene primer coating composition was prepared by diluting 100 parts of RB 116 (produced by NIPPON BEE CHEMICAL CO., LTD.) with 40 parts of a dilution solvent A. The dilution solvent A was formed by mixing toluene, xylene, and Ipusole (hydrocarbon solvent produced by Marubeni Chemix Corporation) in proportions of 20 parts: 20 parts: 60 parts (total 100 parts).

Pretreatment of ABS Substrate

An ABS substrate having a size of 70 mm×100 mm×3 mm was cleaned with isopropanol and dried.

Formation of Base Coating Film Layer

A diluted two-package polyurethane coating composition for a base coating composition was applied by spraying onto the above-mentioned pretreated polypropylene substrate or ABS substrate in such a way that a dry film thickness is 25 pin, and cured at 80° C. for 30 minutes to obtain a test piece in which a base coating film layer was formed. Here, the diluted two-package polyurethane coating composition for a base coating composition was prepared by using the total 574.26 parts of a main material solution (subtotal 497.96 parts) comprising 248.98 parts of an acrylic polyol main material solution and 248.98 parts of a dilution solvent B, and 76.3 parts of a curing agent solution A. The dilution solvent B was formed by mixing butyl acetate ester, methyl isobutyl ketone, xylene, and Ipusole in proportions of 35 parts: 10 parts: 33 parts: 22 parts (total 100 parts). The curing agent solution A was formed by mixing 75 parts of Sumidur N-3300, a commercially available polyisocyanate compound, and 25 parts of butyl acetate ester.

Formation of Silver-plating Layer

Hydrochloric acid solution of 0.2% tin(II)chloride was applied onto the surface of the above-mentioned test piece, in which the base coating film layer was formed, and then water-washed. To the water-washed test piece, a mixed aqueous solution of silver nitrate and excessive ammonia and a glucose solution were simultaneously applied to form a uniform silver-plating layer of about 20 µm in thickness. By removing a residual fraction through water-washing, a test piece in which the silver-plating layer was formed on the above base coating film layer was obtained.

Formation of Clear Layer

The main material solution of a coating composition and the curing agent solution, shown in Table 2, were mixed to obtain each clear coating composition. Each clear coating composition was applied by spraying onto the above-mentioned test piece in which the silver-plating layer was formed in such a way that a cured film thickness is 30 µm, and cured at 80° C. for 20 minutes to obtain a test piece provided with a clear coating film layer.

The resulting test piece was evaluated by the following evaluation methods. The results of evaluation are shown in Table 2.

(Evaluation Method)

Corrosion Resistance

After being immersed in a 5% aqueous solution of sodium chloride of 40° C. for 10 days, the test piece was taken out, and after water-washing, water was wiped off the surface and a state of the surface was visually observed.

◯: The silver-plating film has no defect such as discoloration, whitish haze and peeling and is in a good condition.

X: The silver-plating film has a defect such as discoloration, whitish haze and peeling.

Appearance of Coating Film

The appearances of the test pieces of Examples and Comparative Examples were visually observed according to the following criteria.

◯: There is no abnormal appearance such as an interference fringe and haze.

X: There is an abnormal appearance such as an interference fringe and haze.

Adhesion; Adhesion After Water-soak Test

After being immersed in hot water of 40° C. for 10 days, the test piece was taken out and after water was wiped off the surface of the test piece, the test piece was left standing at 25° C. for 1 hour. Then, one hundred of lattices of 2 mm square were formed by cutting slits with a cutter and a peel strength test was conducted with an adhesive tape.

◯: There is no defect such as peeling of lattice or chips in a cut portion.

X: There is a defect such as peeling of lattice or chips in a cut portion.

TABLE 2

| | | NV % | Example 1 Solids | Example 1 Solution | Example 2 Solids | Example 2 Solution | Example 3 Solids | Example 3 Solution | Example 4 Solids | Example 4 Solution | Example 5 Solids | Example 5 Solution |
|---|---|---|---|---|---|---|---|---|---|---|---|---|
| I-1: Main material solution of coating composition | A: rust preventive agent | 100 | 1.2 | 1.2 | 3.0 | 3.0 | 7.0 | 7.0 | 12.0 | 12.0 | 3.0 | 3.0 |
| | B: acrylic polyol (LR2586) | 45 | 98.8 | 219.6 | 97.0 | 215.6 | 93.0 | 206.7 | 88.0 | 195.6 | 97.0 | 215.6 |
| | Total | | 100.0 | 220.8 | 100.0 | 218.6 | 100.0 | 213.7 | 100.0 | 207.6 | 100.0 | 218.6 |
| | E: Non-aqueous dispersed resin (Setalux 1850SS-50) | 50 | | | | | | | | | 10.8 | 21.6 |
| | F: Epoxysilane (KBM-403) | 100 | | | | | | | | | 3.2 | 3.2 |
| | Total | | | | | | | | | | 114.0 | 243.4 |
| | Surface control agent (SH2000-100CS) | 1 | 0.02 | 2.0 | 0.02 | 2.0 | 0.02 | 2.0 | 0.02 | 2.0 | 0.02 | 2.0 |
| | Light stabilizer (SANOL LS-292) | 100 | 1.0 | 1.0 | 1.0 | 1.0 | 1.0 | 1.0 | 1.0 | 1.0 | 1.8 | 1.8 |
| | Ultraviolet absorber (TINUVIN 384 solution) | 90 | 2.3 | 2.6 | 2.3 | 2.6 | 2.3 | 2.6 | 2.3 | 2.6 | 4.4 | 4.9 |
| | C: Butyl acetate ester | | | 50.3 | | 49.4 | | 47.4 | | 44.8 | | 65.9 000.0 |
| | Total | | 103.32 | 276.7 | 103.32 | 273.6 | 103.32 | 266.7 | 103.32 | 258.0 | 120.22 | 318.0 |
| | NV % | | | 37.3 | | 37.8 | | 38.7 | | 40.0 | | 37.8 |
| I-2: Curing agent solution | D: NCO compound | 70 | 17.0 | 24.30 | 18.5 | 26.40 | 17.7 | 25.30 | 18.4 | 26.30 | 18.4 | 26.30 |
| | Total | | 120.32 | 301.0 | 121.82 | 300.0 | 121.02 | 292.0 | 121.72 | 284.3 | 139.62 | 344.3 |
| | NV % | | | 40.0 | | 40.6 | | 41.4 | | 42.8 | | 40.3 |
| Plastic substrate | | | Polypropylene | Polypropylene | Polypropylene | Polypropylene | ABS | ABS | Polypropylene | Polypropylene | Polypropylene | Polypropylene |
| Corrosion resistance | | | ◯ | | ◯ | | ◯ | | ◯ | | x | |
| Appearance | | | ◯ | | ◯ | | ◯ | | ◯ | | ◯ | |
| Adhesion | | | ◯ | | ◯ | | ◯ | | ◯ | | ◯ | |
| A/[(A + B) = 100] | | | 1.2 | | 3.0 | | 7.0 | | 12.0 | | 3.0 | 0.0 |
| NCO/OH (equivalence ratio) | | | 0.9/1 | | 1.0/1 | | 1.0/1 | | 1.1/1 | | 1.0/1 | |

TABLE 2-continued

|  |  | NV % | Comparative Example 1 | | Comparative Example 2 | | Comparative Example 3 | | Comparative Example 4 | |
| --- | --- | --- | --- | --- | --- | --- | --- | --- | --- | --- |
|  |  |  | Solids | Solution | Solids | Solution | Solids | Solution | Solids | Solution |
| I-1: Main material solution of coating composition | A: rust preventive agent | 100 | 0.0 | 0.0 | 14.0 | 14.0 | 3.0 | 3.0 | 3.0 | 3.0 |
|  | B: acrylic polyol (LR2586) | 45 | 100.0 | 222.2 | 86.0 | 191.1 | 97.0 | 215.6 | 97.0 | 215.6 |
|  | Total |  | 100.0 | 222.2 | 100.0 | 205.1 | 100.0 | 218.6 | 100.0 | 218.6 |
|  | E: Non-aqueous dispersed resin (Setalux 1850SS-50) | 50 |  |  |  |  |  |  |  |  |
|  | F: Epoxysilane (KBM-403) Total | 100 |  |  |  |  |  |  |  |  |
|  | Surface control agent (SH2000-100CS) | 1 | 0.02 | 2.0 | 0.02 | 2.0 | 0.02 | 2.0 | 0.02 | 2.0 |
|  | Light stabilizer (SANOL LS-292) | 100 | 1.0 | 1.0 | 1.0 | 1.0 | 1.0 | 1.0 | 1.0 | 1.0 |
|  | Ultraviolet absorber (TINUVIN 384 solution) | 90 | 2.3 | 2.6 | 2.3 | 2.6 | 2.3 | 2.6 | 2.3 | 2.6 |
|  | C: Butyl acetate ester |  |  | 51.0 |  | 43.9 |  | 49.4 |  | 49.4 |
|  | Total |  | 103.32 | 278.8 | 103.32 | 254.6 | 103.32 | 273.6 | 103.32 | 273.6 |
|  | NV % |  |  | 37.1 |  | 40.6 |  | 37.8 |  | 37.8 |
| I-2: Curing agent solution | D: NCO compound | 70 | 19.1 | 27.3 | 16.4 | 23.4 | 12.9 | 18.4 | 24.0 | 34.3 |
|  | Total |  | 122.42 | 306.1 | 119.72 | 278.0 | 116.22 | 292.0 | 127.32 | 307.9 |
|  | NV % |  |  | 40.0 |  | 43.1 |  | 39.8 |  | 41.4 |
| Plastic substrate |  |  | Polypropylene | | Polypropylene | | Polypropylene | | | |
| Corrosion resistance |  |  | ○ | | x | | ○ | | | |
| Appearance |  |  | x | | ○ | | ○ | | | |
| Adhesion |  |  | x | | ○ | | x | | | |
| A/[(A + B) = 100] |  |  | 14.0 | | 3.0 | | 3.0 | | | |
| NCO/OH (equivalence ratio) |  |  | 1.0/1 | | 0.7/1 | | 1.3/1 | | | |

Rust preventive agent Nopcochecks RA produced by SANNOPCO LTD., rust preventive agent of a fatty acid amide compound From the results of Table 2, it was found that the multilayer coating film obtained by using the clear coating composition of the present invention has excellent properties in corrosion resistance and adhesion.

INDUSTRIAL APPLICABILITY

Since the clear coating composition of the present invention does not cause the discoloration or whitish haze of a silver-plating layer even after extended periods of use and has the excellent design for a long time, it can be used for coating in automobile interior parts such as a meter cluster, a center cluster, a center console, etc.; automobile exterior parts such as wheel caps, a bumper braid, wheel garnishes, a grille radiator, aback panel, door mirror covers, door handles, etc.; and applications other than automobile's parts such as a air conditioner's housing, a cellular phone, a notebook computer, a cosmetic case, etc.

The invention claimed is:

1. A multilayer coating film obtained by forming a base coating film layer, a silver-plating layer and a clear coating film layer in succession on plastic substrate,
   wherein said clear coating film layer comprises a clear coating composition being a two-package polyurethane coating composition comprising a main material containing acrylic polyol and a curing agent containing a polyisocyanate compound,
   the equivalence ratio of an NCO group in said polyisocyanate compound to an OH group in said acrylic polyol (NCO/OH) ranges from 0.8/1 to 1.2/1 and the clear coating composition contains a rust preventive agent in the proportions of 1.0 to 13.0 parts on a basis of solids weight with respect to 100 parts by weight of the total of the acrylic polyol and the rust preventive agent;
   wherein said rust preventive agent is a fatty acid amide compound.

2. The multilayer coating film according to claim 1, wherein said main material contains acrylic polyol, a non-aqueous dispersed resin and epoxysilane expressed by the following general formula (1):

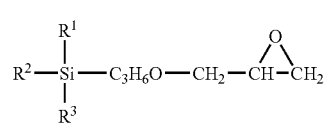

(1)

wherein $R^1$ represents a methyl group, a methoxy group or an ethoxy group, and $R^2$ and $R^3$ are identical to or different from each other and represent a methoxy group or an ethoxy group.

3. An inmold decoration product comprising a silver-plating layer,
   which is obtained by forming the base coating film layer, the silver-plating layer and the clear coating film layer according to claim 1 or 2 in succession on a plastic material.

4. The inmold decoration product according to claim 3, which has a primer layer between the plastic material and the base coating film layer.

* * * * *